US008566944B2

(12) United States Patent
Peinado et al.

(10) Patent No.: US 8,566,944 B2
(45) Date of Patent: Oct. 22, 2013

(54) MALWARE INVESTIGATION BY ANALYZING COMPUTER MEMORY

(75) Inventors: Marcus Peinado, Bellevue, WA (US); Weidong Cui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 12/767,810

(22) Filed: Apr. 27, 2010

(65) Prior Publication Data
US 2011/0265182 A1 Oct. 27, 2011

(51) Int. Cl.
*G06F 12/16* (2006.01)

(52) U.S. Cl.
USPC ...... 726/24; 713/188; 711/154; 711/E12.001; 711/E12.091

(58) Field of Classification Search
USPC .................. 726/22–24; 713/164–167
See application file for complete search history.

(56) References Cited

U.S. PATENT DOCUMENTS

| | | | |
|---|---|---|---|
| 6,077,313 A | 6/2000 | Ruf | |
| 6,173,444 B1 | 1/2001 | Archambault | |
| 6,813,761 B1 * | 11/2004 | Das et al. ................... | 717/132 |
| 7,003,760 B1 | 2/2006 | Das | |
| 7,093,239 B1 | 8/2006 | Van der Made | |
| 7,571,476 B2 | 8/2009 | Horne | |
| 8,065,731 B1 * | 11/2011 | Nucci et al. ................ | 726/24 |
| 8,321,942 B1 * | 11/2012 | Chiueh et al. .............. | 726/24 |
| 8,341,745 B1 * | 12/2012 | Chau et al. ................. | 726/24 |
| 8,407,800 B2 * | 3/2013 | Schloegel et al. .......... | 726/25 |
| 2003/0167458 A1 | 9/2003 | Santhanam | |
| 2005/0108562 A1 * | 5/2005 | Khazan et al. ............. | 713/200 |
| 2005/0172338 A1 | 8/2005 | Sandu et al. | |
| 2005/0229250 A1 * | 10/2005 | Ring et al. .................. | 726/23 |
| 2007/0174915 A1 * | 7/2007 | Gribble et al. ............. | 726/24 |
| 2008/0016572 A1 | 1/2008 | Burkhardt et al. | |
| 2008/0195999 A1 | 8/2008 | Cohen | |
| 2008/0201688 A1 | 8/2008 | Centonze | |
| 2008/0229286 A1 | 9/2008 | Kahlon | |
| 2008/0288834 A1 * | 11/2008 | Manovit et al. ............ | 714/718 |
| 2008/0320594 A1 | 12/2008 | Jiang | |
| 2010/0011441 A1 | 1/2010 | Christodorescu et al. | |
| 2010/0058475 A1 * | 3/2010 | Thummalapenta et al. .... | 726/25 |
| 2010/0131721 A1 * | 5/2010 | Title et al. .................. | 711/154 |
| 2010/0180344 A1 * | 7/2010 | Malyshev et al. .......... | 726/23 |
| 2010/0313190 A1 * | 12/2010 | Cui et al. .................... | 717/156 |
| 2011/0023120 A1 * | 1/2011 | Dai et al. .................... | 726/23 |

OTHER PUBLICATIONS

Hoglund, G. et al.; "Rootkits: Subverting the Windows Kernel"; Addison-Wesley Professional, 2005; pp. 169-212.

(Continued)

*Primary Examiner* — Amare F Tabor

(57) ABSTRACT

Technology is described for malware investigation by analyzing computer memory in a computing device. The method can include performing static analysis on code for a software environment to form an extended type graph. A raw memory snapshot of the computer memory can be obtained at runtime. The raw memory snapshot may include the software environment executing on the computing device. Dynamic data structures can be found in the raw memory snapshot using the extended type graph to form an object graph. An authorized memory area can be defined having executable code, static data structures, and dynamic data structures. Implicit and explicit function pointers can be identified. The function pointers can be checked to validate that the function pointers reference a valid memory location in the authorized memory area and whether the computer memory is uncompromised.

20 Claims, 3 Drawing Sheets

(56) References Cited

OTHER PUBLICATIONS

Russinovich, M. et al.; "Microsoft Windows Internals (4th Edition)"; Microsoft Press, 2005; p. 297.

Moser, et al., "Limits of Static Analysis for Malware Detection", Retrieved at <<http://www.iseclab.net/papers/staticanalysis.pdf >>, 23rd Annual Computer Security Applications Conference (ACSAC 2007), Dec. 10-14, 2007, pp. 1-10.

Bayer, et al., "Dynamic Analysis of Malicious Code", Retrieved at <<http://citeseerx.ist.psu.edu/viewdoc/download?doi=10.1.1.73.5746&rep=rep1&type=pdf >>, Journal in Computer Virology, vol. 2, No. 1, Aug. 2006, pp. 67-77.

Balzarotti, et al., "Efficient Detection of Split Personalities in Malware", Retrieved at <<http://www.iseclab.org/papers/NDSS2010.pdf >>, 17th Annual Network and Distributed System Security Symposium (NDSS 2010), Feb. 2010, pp. 17.

Lanzi, et al., "K-Tracer: A System for Extracting Kernel Malware Behavior", Retrieved at <<http://www.isoc.org/isoc/conferences/ndss/09/pdf/12.pdf >>, In the Proceedings of the 16th Annual Network and Distributed System Security Symposium (NDSS'09), Feb. 2009, pp. 16.

Nick L. Petroni, Jr., et al., "Automated Detection of Persistent Kernel Control-Flow Attacks", CCS '07, Oct. 29-Nov. 2, 2007, Alexandria Virginia.

Akritidis, P.; et al.; "Preventing Memory Error Exploits with WIT"; Proceedings of the 2008 IEEE Symposium on Security and Privacy; 2008; IEEE Computer Society, Washington, D.C.; pp. 263-277.

Andersen, L.O.; "Program Analysis and Specialization for the C Programming Language"; Ph.D. Thesis, University of Copenhagen; May 1994; 311 pages.

"Apache JMeter"; www.jakarta.apache.org/jmeter; accessed Apr. 29, 2009; 2 pages.

Avots, D. et al.; "Improving Software Security with a C Pointer Analysis"; Proceedings of the 27th International Conference on Software Engineering; 2005; pp. 332-341.

Baliga, a. et al.; "Automatic Inference and Enforcement of Kernel Data Structure Invariants"; Proceedings of the 2008 Annual Computer Security Applications Conference; 2008; IEEE Computer Society, Washington, D.C.; pp. 77-86.

Castro, M. et al.; "Securing Software by Enforcing Data-Flow Integrity"; Proceedings of the 7th Symposium on Operating Systems Design and Implementation; 2006; USENIX Association, Berkeley, CA; pp. 147-160.

Costa, M. et al.; "Bouncer: Securing Software by Blocking Bad Input"; Proceedings of the 2nd Workshop on Recent Advances on Intrusion-tolerant Systems; 2008; ACM, New York, NY; Article 1, 14 pages.

Cozzie, A. et al.; "Digging for Data Structures"; Proceedings of the 8th USENIX Conference on Operating Systems Design and Implementation; 2008; USENIX Association, Berkeley, CA; pp. 255-266.

Das, M.; "Unification-Based Pointer Analysis with Directional Assignments"; Proceedings of the ACM SIGPLAN 2000 Conference on Programming Language Design and Implementation; 2000; ACM, New York, NY; pp. 35-46.

"Debugger Engine and Extension APIs"; http://msdn.microsoft.com/en-us/library/cc267863.aspx; retrieved Sep. 6, 2012.

Dolan-Gavitt, et al.; "Robust Signatures for Kernel Data Structures"; Proceedings of the 16th ACM Conference on Computer and Communications Security; Nov. 2009; pp. 566-577.

Emami, M. et al.; "Context-Sensitive Interprocedural Points-to Analysis in the Presence of Function Pointers"; SIGPLAN Not. 29, 6; Jun. 1994; pp. 242-256.

Erlingsson, U. et al.; "XFI: Software Guard for System Address Spaces"; Proceedings of the 7th USENIX Symposium on Operating Systems Design and Implementation; vol. 7; 2006; USENIX Association, Berkeley, CA, 14 pages.

Garfinkel, T. et al.; "A Virtual Machine Introspection Based Architecture for Intrusion Detection"; Proceedings of Network and Distributed Systems Security Symposium; 2003; pp. 191-206.

"Google-Breakpad"; www.code.google.com/p/google-breakpad; accessed Apr. 29, 2009; 1 page.

Hardekopf, B. et al.; "The Ant and the Grasshopper: Fast and Accurate Pointer Analysis for Millions of Lines of Code"; Proceedings of the 2007 ACM SIGPLAN Conference on Programming Language Design and Implementation; 2007; ACM, New York, NY; pp. 290-299.

Heintze, N. et al.; "Ultra-Fast Aliasing Analysis using CLA—A Million Lines of C Code in a Second"; Proceedings of the ACM SIGPLAN 2001 Conference on Programming Language Design and Implementation; ACM, New York, NY; pp. 254-263.

Hultquist, S.; "Rootkits: The Next Big Enterprise Threat?"; http://www.infoworld.com; Apr. 30, 2007; 6 pages.

Jiang, X. et al.; "'Out-of-the-Box' Monitoring of VM-Based High-Interaction Honeypots"; Proceedings of the 10th International Conference on Recent Advances in Intrusion Detection; 2007; Springer-Verlag, Berlin, Germany; pp. 198-218.

Lanzi, A. et al.; "K-tracer: A System for Extracting Kernel Malware Behavior"; NDSS; The Internet Society; 2009; 16 pages.

Litty, L. et al.; "Hypervisor Support for Identifying Covertly Executing Binaries"; Proceedings of the 17th Conference on Security Symposium; 2008; USENIX Association, Berkeley, CA; pp. 243-258.

Miné, A.; "Field-Sensitive Value Analysis of Embedded C Programs with Union Types and Pointer Arithmetics"; Proceedings of the 2006 ACM SIGPLAN/SIGBED Conference on Language, Compilers, and Tool Support for Embedded Systems; 2006; ACM, New York, Ny; pp. 54-63.

"Mozilla Foundation. Talkback"; www.developer.mozilla.org/en/Crashreporting; Apr. 27, 2009; 4 pages.

"Offensive Compuiting. Public malware database";I http://www.offensivecomputing.net; accessed Sep. 9, 2012.

"Overview of Memory Dump File Options for Windows Vista, Windows Server 2008, Windows Server 2003, Windows XP, and Windows 2000"; www. support.microsoft.com/kb/254649; Feb. 20, 2009; 6 pages.

Payne, B. et al.; "Lares: An Architecture for Secure Active Monitoring using Virtualization"; Proceedings of the 2008 IEEE Symposium on Security and Privacy; 2008; IEEE Computer Society, Washington, DC; pp. 233-247.

Pearce, D. et al.; "Efficient Field-Sensitive Pointer Analysis of C"; ACM Trans. Program. Lang. Syst. 30; vol. 1; Article 4; Nov. 2007; 42 pages.

Petroni, N. et al.; "An Architecture for Specification-Based Detection of Semantic Integrity Violations in Kernel Dynamic Data"; Proceedings of the 15th Conference on USENIX Security Symposium; vol. 15; 2006; USENIX Association, Berkeley, CA; 24 pages.

Petroni, N. et al.; "Automated Detection of Persistent Kernel Control-Flow Attacks"; Proceedings of the 14th ACM Conference on Computer and Communications Security; 2007; ACM, New York, NY; pp. 103-115.

Petroni, N. et al.; "Copilot—A Coprocessor-Based Kernel Runtime Integrity Monitor"; Proceedings of the 13th Conference on USENIX Security Symposium; vol. 13; 2004; USENIX Association, Berkeley, CA; pp. 13-29.

"Phoenix Compiler Framework"; http://connect.microsoft.com/Phoenix.

Polishchuk, M. et al.; "Dynamic Heap Inference for Program Understanding and Debugging"; Proceedings of the 34th Annual Symposium on Principles of Programming Languages, 2007; pp. 39-46.

Riley, R. et al.; "Guest-Transparent Prevention of Kernel Rootkits with VMM-Based Memory Shadowing"; Proceedings of the 11th International Symposium on Recent Advances in Intrusion Detection; 2008; Springer-Verlag, Berlin, Germany; pp. 1-20.

"Rootkit.com"; www.rootkit.com; Apr. 28, 2008; 5 pages.

Russinovich, M.; "WinObj v2.15"; http://technet.microsoft.com/en-us/sysinternals/bb896657.aspx; Feb. 14, 2011; 2 pages.

Rutkowska, J.; "klister" http://www.rootkit.com/board_project_fused.php?did=proj14; accessed Jul. 2006.

Seshadri, A. et al.; "SecVisor: A Tiny Hypervisor to Provide Lifetime Kernel Code Integrity for Commodity OSes"; SIGOPS Oper. Syst. Rev. 41, No. 6; Oct. 2007; pp. 335-350.

(56) References Cited

OTHER PUBLICATIONS

Spinellis, D.; "A Tale of Four Kernels"; Proceedings of the 30th International Conference on Software Engineering; 2008; ACM, New York, NY; pp. 381-390.

Steensgaard, B.; "Points-to Analysis in Almost Linear Time"; Proceedings of the 23rd ACM SIGPLAN-SIGACT Symposium on Principles of Programming Languages; 1996; ACM, New York, NY; pp. 32-41.

Tan, L. et al.; "AutoISES: Automatically Inferring Security Specifications and Detecting Violations"; Proceedings of the 17th Conference on Security Symposium; 2008; USENIX Association, Berkeley, CA; pp. 379-394.

"Technical Note TN2123"; www. developer.apple.com/technotes/tn2004/tn2123.html; Apr. 1, 2008; 21 pages.

Wang, Z. et al.; "Countering Persistent Kernel Rootkits through Systematic Hook Discovery"; Proceedings of the 11th International Symposium on Recent Advances in Intrusion Detection; 2008; Springer-Verlag, Berlin, Germany; pp. 21-38.

Whaley, J.; "Context-Sensitive Pointer Analysis using Binary Decision Diagrams"; Ph.D. Dissertation, Stanford University; Mar. 2007; 216 pages.

Wilson R.; "Efficient, Context-Sensitive Pointer Analysis for C Programs"; Ph.D. Dissertation; Stanford University; Dec. 1997; 214 pages.

"Windows Error Reporting"; www.technet.microsoft.com/en-us/library/bb490841.aspx ; Dec. 27, 2004; 10 pages.

"Windows Research Kernel"; www.microsoft.com/resources/sharedsource/windowsacademic/researchkernelkit.mspx; accessed Apr. 29, 2009; 2 pages.

Yin, H. et al.; "Hookfinder: Identifying and Understanding Malware Hooking Behaviors"; Proceedings of NDSS; 2008; 16 pages.

Yin, H. et al.; "Panorama: Capturing System-Wide Information Flow for Malware Detection and Analysis"; Proceedings of the 14th ACM Conference on Computer and Communications Security; 2007; ACM, New York, NY; pp. 116-127.

Zhu, J.; "Towards Scalable Flow and Context Sensitive Pointer Analysis"; Proceedings of the 42nd Annual Design Automation Conference; 2005; ACM, New York, NY; pp. 831-836.

Carbone, "Mapping Kernel Objects to Enable Systematic Integrity Checking", Proceedings of the 16th ACM Conference on Computer and Communications Security, Nov. 9, 2009.

Liang, "Efficient Points-to Analysis for Whole-Program Analysis", Proceedings of the 7th European Software Engineering Conference, Sep. 6-10, 1999.

Shapiro, "Fast and Accurate Flow-Insensitive Points-To Analysis", Proceedings of the 24th ACM SIGPLAN—SIGACT Symposium on Principles of Programming Languages, Jan. 15-17, 1997.

\* cited by examiner

MALWARE INVESTIGATION BY ANALYZING COMPUTER MEMORY

BACKGROUND

A computer that is connected to an untrusted networking environment such as the internet can be exposed to security attacks on a frequent basis. Such attacks may give a malicious attacker control of the target computer. Other types of attacks may send a virus payload onto the computer. Furthermore, the user or owner of the computer may be completely unaware of the fact that the user's computer has been compromised by an attacker.

A number of security technologies and products try to address this problem. However, these existing systems do so in a partial way. One example of this is anti-virus systems, which focus heavily on known descriptions of malicious software. Anti-virus software is generally programmed with descriptions of software vulnerabilities and/or malware that are known to the maker of the anti-virus software. Thus, the anti-virus systems are not able to provide protection against vulnerabilities and malware that are not known to the anti-virus software vendor. For instance, some virus attacks against computer systems are not detected when they are first launched into the wild and this is known as a zero-day vulnerability.

Another type of malware protection software is an intrusion detection system. Intrusion detection systems use a variety of heuristics to identify malware activity on the machine. There are many different intrusion detection systems, using a large variety of heuristics. Overall these systems detect malware that behaves according to the heuristics they implement. It is frequently possible to write malware software that is not detected by these heuristics.

In a similar fashion, Microsoft's KOMOKO system uses a large number of conditions that a correct Windows™ system may be desired to satisfy. These conditions are derived and programmed manually by experts about correct Window's configurations. Many types of malware cause some of these conditions to be violated. KOMOKO can test the conditions and detect such malware. However, these conditions are not complete in the sense that malware can be created that does not violate any of the pre-generated conditions.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for malware investigation by analyzing computer memory of a computing device. An embodiment of a method may include performing static analysis on code for a software environment to form an extended type graph. A raw memory snapshot of the computer memory can be obtained at runtime. The raw memory snapshot can include the software environment executing on the computing device. A software environment may be an operating system kernel with supporting structures such as device drivers, or a software environment may be a web browser or virtual machine. Dynamic data structures can be found in the raw memory snapshot using the extended type graph to form an object graph. An authorized memory area can be defined having executable code, static data structures, and dynamic data structures. Implicit and explicit function pointers can be identified in the authorized memory area. The function pointers can be checked to validate that the function pointers reference a valid memory location in the authorized memory area and to determine whether the computer memory is uncompromised.

DETAILED DESCRIPTION

Figure 1:
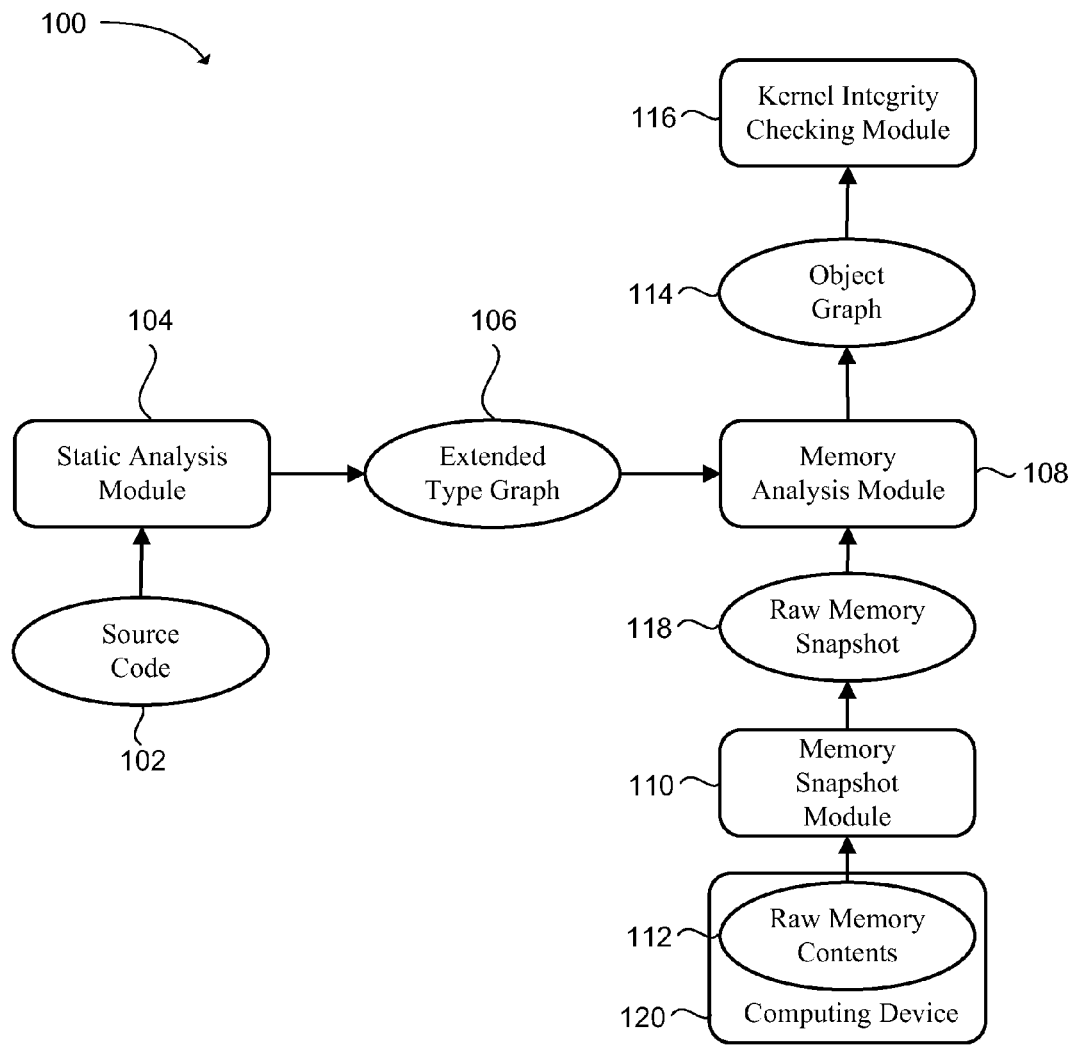
FIG. 1 is a block diagram illustrating an embodiment of a system for malware investigation by analyzing computer memory.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

Modern operating systems are vulnerable to various types of attacks. In particular, kernel-mode malware represents a significant threat to an operating system because of an ability to compromise the security of the kernel and the entire software stack. For example, kernel mode malware can tamper with kernel code and data to hide itself and collect useful information from certain system events (e.g., keystrokes). To mitigate this security threat, the integrity of the complete kernel code and data can be verified.

The integrity of kernel code and static data in a running system can be checked given the read-only nature and well-defined locations of this code and data in memory. However, checking the integrity of dynamic data can be much harder due to the unpredictable memory locations and volatile nature of the dynamic data. Not surprisingly, dynamic data has become one of the most attractive targets for kernel-mode malware.

Previous solutions for checking kernel integrity either limit themselves to kernel execution code and static data (e.g., system call tables) or can reach only a fraction of the dynamic kernel data, resulting in limited security. Previous systems may miss up to 72% of the dynamic kernel data and may fail to identify function pointers manipulated by kernel mode malware. For instance, attackers are able to implement kernel mode malware that tampers with function pointers in objects that cannot be reached by prior checking systems.

The state of a running computer is characterized by its memory contents and by the state of various attached devices (e.g., disks and other hardware devices). The present technology focuses on identifying relevant portions of the memory contents for identifying memory on a computing device that may have been compromised by malware. The memory contents can be classified as executable code and data read or written by the executable code.

A high level description of an embodiment of this technology can first be described, which will be followed by a more detailed description. A system can be used to map operating system kernel data objects in a memory snapshot with extensive coverage and high accuracy. Unlike previous systems, the present technology is designed to address the challenges in pointer-based memory traversal. Static analysis can first be performed on the operating system kernel's source code to construct an extended type graph. In certain configurations, static analysis can also be performed on data that is derived from the source code, as long as the data contains information to aid in constructing the extended type graph. For example, information may be used from existing .pdb files (program database files) for the operating system or an extended version of such database files may be included in the static analysis.

The extended type graph can include type definitions and/or global variables and candidate target types for generic pointers. Given a memory snapshot, a memory analysis can be performed based on the extended type graph. The type ambiguities caused by unions or generic pointers are resolved with multiple candidate target types and the identification of dynamic arrays. The output is an object graph that contains the identified kernel objects and their pointers to other objects. Systematic kernel integrity checking can be performed using this object graph.

The ability to map kernel objects with high coverage and accuracy enables a variety of systematic kernel integrity checks. Function pointers in the kernel can be checked due to the high coverage and accuracy of the memory traversal. In addition, the technology can verify implicit function pointers which are a function pointer field defined inside a union or memory fields that are not defined as a function pointer type but the fields are sometimes used as a function pointer (e.g., unsigned int). Hidden kernel objects can also be systematically uncovered. Unlike previous tools that rely on specific knowledge of a particular data type (e.g., process constructs), the present technology can work with arbitrary kinds of system objects without having to know exactly how the system objects are classified in memory. Instead, a view of certain system objects, such as the list of active processes, can be derived from the kernel objects identified and the view can be compared with information collected from an internal program with a list of registered valid objects. Mismatches in this comparison can reveal hidden kernel objects.

Applying static analysis to the source code of the operating system kernel, drivers, and other components that execute with kernel privileges can capture a comparatively complete view of the data structures that an executing operating system has created. These data structures can then be exhaustively searched for elements that might allow unknown code or malware to execute. Knowledge of a high percentage of all runtime data structures enables investigation and/or the detection of extraneous code on a computer. In some cases, the coverage of the runtime data structures may be 99% or higher.

FIG. 1 illustrates a more detailed embodiment of a system 100 for malware investigation by analyzing computer memory. A static analysis module 104 can be configured to perform a static analysis on source code 102 for an operating system kernel to form an extended type graph 106. The extended type graph can be formed from: nodes representing data types defined in the operating system kernel, edges representing pointers between linked data types, and other nodes representing dynamic data structures. Edges of the extended type graph may have pointers to dynamic objects that can be identified later at runtime when the operating system is actually executing.

In addition, a memory snapshot module 110 can be configured to obtain a raw memory snapshot of the computer memory contents or raw memory contents 112 at runtime. The raw memory snapshot 118 can contain a snapshot of the operating system kernel executing on a computing device 120. The operating system kernel may also include a support structure such as drivers, application program interfaces, virtual device drivers, and direct hardware interfaces. In one embodiment, the memory snapshot module can be configured to obtain the raw memory snapshot from a virtual machine on a computing device. In another configuration, the system may stop the operation of a workstation or personal computer to take the raw memory snapshot. Taking a snapshot of memory from a virtual machine can be easier because the snapshot can be taken without stopping the execution of the virtual machine in memory because execution of the virtual machine can be temporarily suspended and the snapshot can be obtained.

A memory analysis module 108 can be configured to find dynamic data structures in the raw memory snapshot using the extended type graph 106. The memory analysis module can classify the memory contents as executable code, static data structures, and dynamic data structures in order to form an object graph 114. The valid objects in the object graph can form an authorized memory area. The object graph can be created from the static data structures, dynamic data structures, and function pointers at runtime. The object graph is also built to organize the runtime objects. The authorized memory area can also contain other authorized memory objects, as discussed later.

The present technology obtains the dynamic data structures (in addition to code and static data structures) in the raw memory snapshot. This results in obtaining knowledge about a high percentage of the runtime data structures by means of combining static analysis with an analysis of a runtime memory snapshot.

After the object graph and authorized memory area have been setup, the function pointers can be analyzed. The function pointers in the authorized memory area can be identified using the memory analysis module 108. Explicitly declared function pointers are more straight-forward to find. However, to identify all the function pointers, the implicit function pointers can be identified by finding a memory field that is used as a function pointer but the memory field is not declared as a function pointer. An additional type of implicit function pointer can be found by identifying function pointers defined in a union data structure.

A kernel integrity checking module 116 can check the function pointers to validate that the function pointers reference a memory location in the authorized memory area. This check can validate whether the computer memory on the computing device is uncompromised. In other words, if a function pointer references an address location in the authorized memory area, then the function pointer is likely valid and has not been compromised by malware. In contrast, if a function pointer references an area of memory outside the authorized memory area, then the function pointer is considered compromised.

Figure 2:
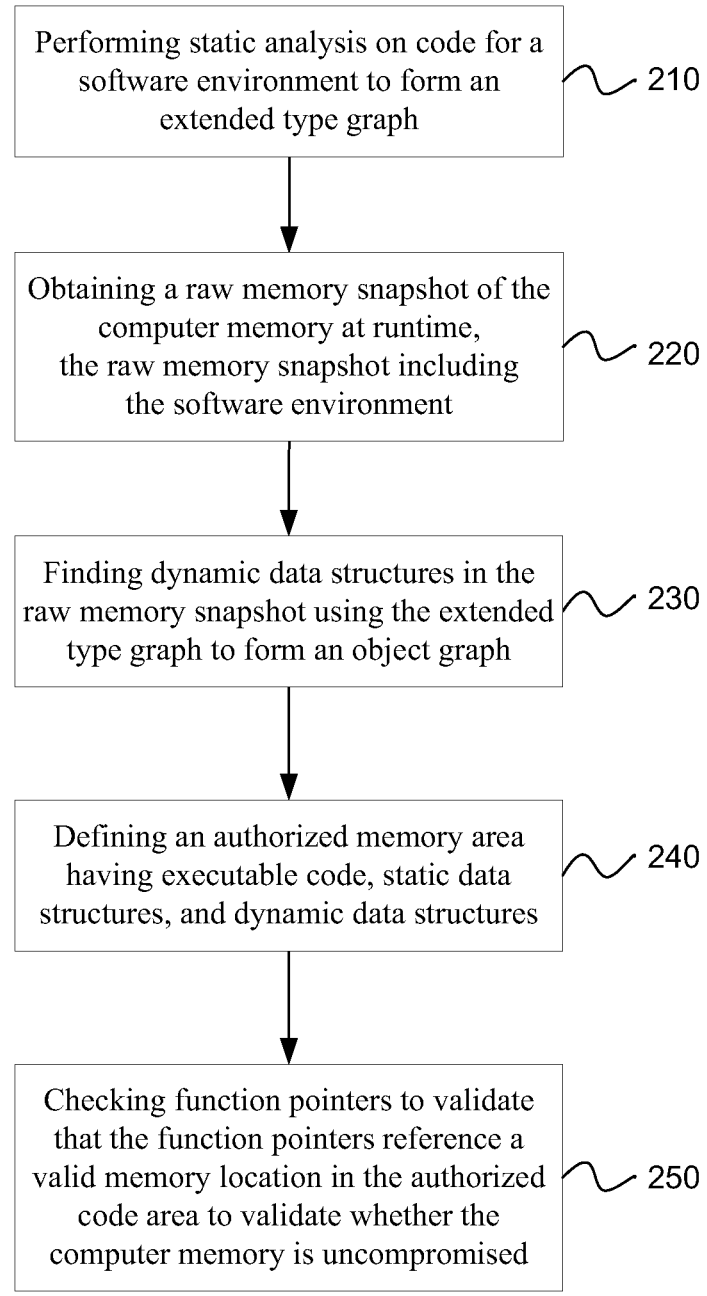
FIG. 2 is a flowchart illustrating an embodiment of a method for malware investigation by analyzing computer memory in a computing device.

FIG. 2 illustrates a method for malware investigation by analyzing computer memory in a computing device. An initial operation is performing static analysis on code for a software environment to form an extended type graph, as in block 210. A software environment can be an environment where computer code can be loaded and executed. Examples of software environments include environments such as an operating system kernel with a support environment (e.g., drivers), a browser environment, a virtual machine environment (e.g. Java), middle ware servers, and other software environments that execute code loaded from external sources that can be compromised. An application level system can also use the present technology to analyze and/or protect against code that is loaded into a complex application environment. Examples of such application environments are: a media player, an office suite of interrelated desktop applications, a suite of programs configured to create PDF documents, or other complex applications that can load and execute external code.

The statically analyzed code may be the source code for an operating system kernel and supporting structure. In the case of an operating system kernel, the kernel can include the complete set of support and extension modules (e.g. device drivers). The source code analyzed may be high level source code, a native machine code, or an intermediate type of code such as byte code. An example of an environment using intermediate code is the Java language.

As discussed, the result of the static analysis can be an extended type graph. The nodes of this graph include the data types defined in the code or source code. The edges can be pointers. For example, if the code defines two data structures A and B, such that A contains a component that is a pointer to a structure of type B, then the nodes may be A and B, and there may be an edge from A to B. Difficulties in identifying the data types arise in the case of structures or fields whose type is not completely determined by the source code (e.g., void * pointer types, union types, fields that are used a pointers, but not declared as pointers). A VOID * or void pointer type may point to objects of varying types. In this example, the extended type graph may contain edges from a VOID * pointer field to multiple object types that this VOID * pointer field may possibly point to (as determined by the points-to analysis). The VOID * pointer field can then be resolved when the actual runtime object is available using techniques which will be described later.

A raw memory snapshot of the computer memory can be obtained at runtime, as in block 220. The raw memory snapshot can include the software environment executing on the computing device. The raw memory snapshot is taken at runtime because this is when the dynamic data structures exist. Before runtime such dynamic data structures cannot be analyzed.

The dynamic data structures can be identified or found in the raw memory snapshot using the extended type graph to form an object graph, as in block 230. Given an extended type graph and the raw memory contents from a executing computer (memory snapshot), the process can find the dynamic data structures that exist in the memory snapshot together with their data types. This can be done recursively. The dynamic data structures can be found by starting with the static data structures in the extended type graph and traversing pointers in the extended type graph until the dynamic data structures are reached.

More specifically, the process starts by identifying the static data which are easy to find. An example, of static data that is easy to find includes global variables, whose locations in binaries can be looked up in .pbd (program database) files for the operating system. Any pointer in any of the static data identifies a new data structure. These data structures may contain further pointers, which may lead to additional data structures and so on. The process can be somewhat more complicated than just described because, as mentioned above, the data type definitions in the source code and the resulting extended type graph may not define all pointers uniquely. For example, some pointers may be void pointers (void *), union types, and pointers that are not declared explicitly as pointers. At each of these pointers, there may be a number of choices, rather than a unique target type. Thus, there is not a unique solution, but a potentially very large set of solutions. The term solution simply means a result that may be selected, given the choices in the extended type graph. Most of these choices are incorrect in the sense that they do not represent the data structures that exist on the executing computer. The process has to find the correct solution or at least a solution that is a reasonably close approximation to the correct solution was described above.

Locating dynamic kernel objects in memory and identifying their types is a challenging step toward enabling systematic integrity checks of dynamic kernel data. This mapping process can locate a dynamic object and a reference to the object can be found, usually in the form of a pointer. This pointer may even be located in another dynamic object, which turns this search into a recursive problem. Mapping all the dynamic objects involves performing an extensive traversal of the memory. The traversal can start from a set of globally well-defined objects and follow each pointer reference to the next object, until the possible objects have been covered.

During analysis, static and dynamic data can be distinguished from each other. Static data, such as global variables, exist in the same memory location from the moment the computing device is booted up until the time the computing device is shut down. On the other hand, dynamic data structures are allocated and freed over time. Given an executing operating system on computing device, finding and interpreting the dynamic data structures can be difficult.

In the past, finding dynamic data structures has suffered from some significant limitations. The prior systems are not able to follow generic pointers (e.g., void *) because the prior systems leverage type definitions, and thus do not know the target types of generic pointers. In contrast, the present technology can use the type definitions in combination with the points-to analysis to begin the identification process for generic pointers.

In addition, prior systems have not been able to follow pointers defined inside unions since the prior systems cannot tell which union subtype may even be considered. Further, the prior systems cannot recognize dynamic arrays or the objects inside them. Since generic pointers, unions, and dynamic arrays are programming paradigms commonly used in operating system kernels, ignoring these types may result in a significantly incomplete memory traversal, as observed in practice. Furthermore, previous systems use significant manual annotations in the source code. For example, all linked list constructs in prior systems are annotated so that the corresponding objects can be correctly identified by the traversal. Some operating systems contain more than 1,500 doubly linked list types in the kernel. This large number makes an annotation process error-prone and time-consuming.

The extended type graph from the static analysis can include nodes having data types defined in the software environment. Edges can be included in the extended type graph to represent pointers between linked data types. One process for creating the extended type graph is generating a points-to graph with nodes representing program pointers and edges representing connections between program pointers. Then candidate target types can be inferred for generic pointers. The extended type graph can be produced from the points-to graph and the generic pointers with candidate target types. Some additional details for computing an extended type graph or type graph for types that are not completely determined by the source code are described in U.S. patent application Ser. No. 12/477,954 entitled "Determining Target Types for Generic Pointers in Source Code" and filed on Jun. 4, 2009 which is incorporated herein by reference in its entirely.

The object graph can be created using information from the extended type graph and information about the dynamic data structures. Memory analysis can map kernel data objects and derive the object graph for a given memory snapshot. The object graph is created by using the extended type graph derived earlier to traverse the kernel memory. To correctly identify runtime kernel objects, three processes can be undertaken: resolving type ambiguities, recognizing dynamic arrays, and controlling identification errors.

A processing for resolving type ambiguities will now be described. Type ambiguities come from two sources: unions and generic pointers that have multiple candidate target types. The range of possible choices in both cases can be referred to as candidate types or candidates. Being able to resolve type ambiguities in memory traversal is a beneficial to kernel analysis. Certain conditions can be considered when determining the correct candidate type. The first is a size condition. Specifically, operating system kernels can store dynamic kernel data in a set of memory allocation units called pool blocks. Each pool block is created by a call to a memory allocation function. Each kernel object is defined by the operating system as residing within a single pool block. When resolving type ambiguities, any candidate that violates the size condition can be rejected.

Another condition can be based on the observation that the data stored by certain data types have specific properties. This condition can be applied to pointer fields. With certain exceptions, pointer fields in kernel objects are either null or assume values in the kernel virtual address range. Drivers that directly access user mode memory, for instance, do not meet this condition. Candidates that violate this condition can be accepted as long as the number of violating pointers is sufficiently small. More precisely, given several candidate types, the fraction of pointer fields that violate the constraint can be computed and the one with the lowest fraction can be chosen. The candidate can be discarded if the fraction of invalid pointer values for the candidate is too high (e.g., >10%).

These two conditions are not only evaluated on the candidates themselves, but also recursively for their "child" objects (i.e., the objects pointed by the candidates) up to a certain depth level (e.g., three). By doing so, the accuracy of type ambiguity resolution can be improved since there is more data to rely upon when making the decision.

A process for recognizing dynamic arrays will now be described. Dynamic arrays are widely used in operating system kernels and drivers. This technology can automatically recognize dynamic arrays in memory traversal using the kernel memory pool boundaries. In other words, a dynamic array is defined to fit into a single pool block. Moreover, a dynamic array is usually allocated in two possible ways: 1) the dynamic array may take up a whole pool block, or 2) the dynamic array may extend an object whose last field is defined as an array of size 0 or 1. Based on these two observations, each allocated pool block can be checked to recognize dynamic arrays after the object traversal (without dynamic arrays) is completed. If a single object is identified at the start of a pool block, the block can be analyzed further to determine if the block contains a dynamic array of the first kind The intuition is that arrays are typically accessed via a pointer to their first element. The array candidate can be then be tested to see if the candidate meets a size condition. This size condition is that the size of a pool block is a multiple of the size of the first object plus some number between 0 and A−1, where A is the pool block alignment value. Finally, a pointer value condition for each array element can be checked. The dynamic array candidate can be accepted when a sufficiently large fraction of array elements (e.g., >80%) have a low fraction of invalid pointer values. A pool block can be checked for a dynamic array of the second kind if there is an empty space (i.e., no objects were found) trailing an object and the object's last element is an array of size 0 or 1. For such objects, the size and pointer value conditions can be checked as described above. The newly identified dynamic arrays can be used as roots for reruns of the traversal algorithm. This process may be repeated until no more dynamic arrays can be found.

A process for controlling object identification will now be discussed. During the memory traversal, an object may be incorrectly identified for a number of reasons: choosing the wrong candidate when resolving type ambiguities, mistaking a dynamic array, or program bugs (e.g., dangling pointers). Given the recursive nature of the memory traversal, an incorrect object may cause more errors during the rest of the traversal. Therefore, reducing identification errors and preventing errors from propagating is valuable. Instead of performing a single complete traversal, the kernel memory is traversed in multiple rounds. The reason for multiple traversals is to identify unambiguous kernel objects and use those objects to constrain the solution space.

In one example, the memory traversal can be performed in three distinct rounds. In the first round, all the global objects and objects referenced by global pointers are identified. These global pointers can be the roots used in the traversal and are likely to be correct. In the second traversal round, the kernel memory is traversed starting from the objects found in the first traversal round, but the traversal follows pointer fields that do not have type ambiguities. Dynamic arrays are not inferred in the first traversal either. This way the identification errors that may be caused by either resolving type ambiguities or inferring dynamic arrays are avoided. In the third round, the traversal starts from the objects found in the previous rounds. The kernel memory is traversed and type ambiguities are resolved where necessary. The dynamic arrays are also identified and traversed in this round (after the traversal without dynamic arrays is finished). If two objects identified in the same round conflict with each other, then both objects are kept.

A depth-first traversal can be performed in each round. To limit the damage caused by an earlier identification error, a safe-guard mechanism can be used. Whenever a typed pointer is followed during the traversal, the technology can check to see if the object implied by the pointer type meets the conditions used to resolve type ambiguities, as discussed previously. This can be treated as a case in which only a single candidate is considered. If the object violates either type ambiguity resolution condition, the object can be discarded and that branch of the traversal can be stopped.

Returning again to FIG. 2, authorized memory area can be defined, in part, using the memory contents in the object graph such as: executable code, static data structures, and dynamic data structures, as in block 240.

Function pointers are commonly used throughout the operating system kernel to perform indirect calls. A technique used by malware is to change the function pointer values to point to malicious code. This is an action also known as hooking By doing so, malware can hijack the operating system control flow whenever an indirect call of these function pointers occurs. This allows the malware to intercept and control certain types of system activity.

A common task in detecting unknown or analyzing known kernel mode malware is to identify all the function pointers manipulated by the malware. The ideal way to do this is to inspect the values of all function pointers in the kernel and determine if they point to legitimate targets. There are some difficulties with this. First, many function pointers reside in dynamic kernel objects, and therefore do not have a fixed location in memory. Second, inside a single object, not all function pointers can be unequivocally identified. This can happen in the following two scenarios: (1) a field is not declared as a function pointer type but effectively used as a function pointer (e.g., unsigned int), and (2) a function pointer is defined inside a union. We refer to these as implicit function pointers and all the others as explicit function pointers. Thus, the task of complete and accurate function pointer identification is a challenge in modern operating systems.

To address these issues, a systematic analysis of function pointers can be performed in a kernel memory snapshot. Particularly, the analysis leverages the nearly complete memory traversal to identify kernel objects. Due to the greater coverage of the kernel memory, the function pointers of a much larger set of objects can be verified in the present technology as compared to previous approaches.

The points-to analysis can also be used to recognize implicit function pointers. Being able to identify malicious implicit function pointers in kernel memory is valuable. Initially, a white list of trusted modules is obtained, and this includes the kernel and trusted drivers. Given a memory snapshot, a check can be made to determine if the code of these modules was modified. If so, any modified parts of the code are marked as untrusted. The rest of the code is treated as trusted. Every function pointer in the kernel objects found by the system can be marked based on the following policy: an explicit function pointer that points to trusted code is considered non-malicious; an implicit function pointer that points to either trusted code or a data object found by the system is considered non-malicious code; otherwise, the function pointer is marked as malicious. This policy is powerful. For example, any function pointer that targets untrusted code placed in unused blocks of memory can be detected. By leveraging the high coverage, false alarms may be avoided in at least these cases: (1) the flow-insensitive points-to analysis mistakenly identifies data pointers as implicit function pointers, due to imprecision; and (2) data pointers share the same offset as a function pointer in a union.

Function pointers can be identified that include implicit and explicit function pointers in the authorized memory area. The function pointers can be identified using the object graph. Implicit function pointers can be found by identifying a memory field that is used as a function pointer but the memory field is not declared as a function pointer (i.e., int unsigned). Such implicit function pointers can be found by using the points-to analysis. Similarly, function pointers can be identified that are defined in a union data structure.

The function pointers in the raw memory snapshot can be validated to check that the function pointers reference a valid memory location in the authorized memory area to validate whether the computer memory is uncompromised, as in block 250. In other words, the function pointers are checked to see if they have been affected, modified, or created by malicious programs.

Additionally, the traversal information generated by this technology can be used to retrieve the traversal path to objects whose function pointers were found to be malicious. Such information is useful because this path often reveals the purpose of the function pointer. For instance, simply knowing about a function pointer in an EX_CALLBACK_ROU-TINE_BLOCK object does not tell us what the function is for. However, if the pointer is used to intercept process creation events this behavior shows that the pointer is referenced from a global pointer array in PspCreateProcessNotifyRoutine.

As discussed, the goal of this technology is to ensure that unauthorized code or malware cannot execute using known mechanisms. This technology does not need to detect whether malicious code is on the machine. Instead, the technology can detect whether the system is in a state in which malicious code is or could be executing.

In order to be able evaluate the entire software system in memory to see whether the memory has been compromised, the system can identify kernel loading paths that enable code to be executed on the computer memory without using function pointers. This enables the entire environment to be evaluated to determine whether malware has compromised the integrity of the system. When such kernel loading paths have been identified, the system can check to see whether malicious code is trying to execute using the identified kernel loading paths. This enables the system to ascertain whether a computer system may have been compromised by being exposed to an uncontrolled computing environment by checking for compromised function pointers and compromised loading paths.

For this purpose, the system state can be checked at selected points in time for certain activity. An example of this is finding out whether malicious code is currently executing. To do this, the instruction pointers (e.g., the stack pointer) of all processors (CPUs) on the system can be checked to determine whether the instruction pointers are pointing into code that is in the authorized memory area (e.g., code known to be good). Other benchmark checks for the system state can also be made. For example, a check can be made regarding whether an x64 CPU is executing in protected mode when the processor is expected to be in protected mode. This means that the processor is using page tables.

Another check that can be made is whether there is any known mechanism in the underlying hardware and software that could cause bad code to be executed. This includes any known means of transferring control flow to a new target address. At the hardware level, such means include the mechanisms for: trap handling, system call handling, exception handling, interrupt handling. These mechanisms work as described next. During the regular course of execution of software, some event may occur that interrupts the software (trap, system call, exception, interrupt). These events may be caused by the software itself or by something else such as a hardware interrupt. Either way, the hardware will invoke a piece of software (that has been previously determined by software) in response to the event. In practice, the hardware specifies certain memory locations or registers where software can write function pointers that point to the event handler software. In x86, x64 personal computers, these are the Interrupt Descriptor Table (IDT), the Local Descriptor Table (LDT) and the Global Descriptor Table (GDT). The system can be checked to see if these interrupt tables are pointing to locations that are in the authorized memory area. Alternatively, these tables can be checked to see if they are pointing to unexpected locations or checked to see if the tables have been changed when the table should not have been changed.

The instructions that may change control flow using the instruction pointer to a target address that is not (or is not entirely) specified in the instruction itself are of particular concern. In some processor architectures these instructions include CALL, JUMP, and RET machine instructions, and the equivalent to these instruction can be identified in other processor architectures. Since some of these instructions may use data (stored outside the code itself) to determine the target of the control flow transfer, the data used to determine a target of the control flow transfer can be checked to see if this data points into code that is in the authorized memory area (e.g., code known to be good). In the case of indirect CALL and JUMP instructions, these data are typically called "function pointers" at the software level. In the case of RET instructions, this data is return addresses on the stack.

At the operating system software level, the memory locations that can be used as return addresses may also be checked. This includes (a) finding all threads, (b) finding all the stacks of each thread and (c) finding the return addresses on each stack. The first two tasks can be accomplished using the memory analysis phase. There is a thread object for each thread and the memory analysis phase can find the thread object. In the thread object, there are fields that point to the stacks and the memory analysis phase can find those fields too. The task of finding the return addresses on each stack can be accomplished by techniques such as virtual stack unwinding.

In the case of the application software level (e.g., browsers, etc.), the function pointers and return addresses that can be checked at the operating system level may also be checked for each application thread. Furthermore, system calls and similar function calls can be considered "instructions" that are available to applications. So, any system calls provided by the operating system can be analyzed to determine if they have the property of changing the control flow to a target address that is not entirely (or is not) specified in the parameters of the system call itself. If the system call has this property, then the system call can be analyzed in detail.

In one embodiment, the raw memory snapshot can be obtained from a computing device that is a virtual machine. The virtual machine can reside alone or with one or more other virtual machines on a blade server, general server, workstation, or desktop computer. Using this technology in a virtual machine environment is effective because a coherent memory snapshot can be taken without disrupting the machine.

The set of device drivers used by a virtual machine is typically constrained which makes the search for dynamic objects at runtime more straight-forward. In many virtual machine environments, the set of authorized device drivers is fixed because such drivers are typically provided by either the operating system vendor or the VMM (virtual machine monitor) vendor. A limited set of authorized device drivers typically exists because virtual machines generally access virtual devices exposed by the VMM, as opposed to real physical devices. Accordingly, virtual machines are often configured to use the same standard devices provided by the VMM, whereas a physical computer typically can see hardware devices that may have been produced by a large variety of hardware makers. This type of configuration applies in particular to cloud computing environments where hundreds or thousands of identical servers are harnessed to process distributed loads.

In cloud computing applications, large numbers of virtual machines may exist with the same collection of drivers. The static analysis can be performed for this collection of drivers. At runtime, the virtual machine monitor (VMM) then takes memory snapshots of the running virtual machines (VM) based on some policy. For instance, one snapshot an hour may be taken. It is straight-forward to take a coherent memory snapshot from a running virtual machine without interrupting the virtual machine. The system then performs the steps described previously on the memory snapshot and evaluates the memory which includes testing the function pointers and the other possible tests described. If this test fails, the virtual machine from which the snapshot was taken can be considered to be compromised, and the administrator can take appropriate action. If the test does not fail, the administrator can have high confidence that the VM was not compromised.

To provide the desired result, the relevant software (e.g. code allowed to run in kernel mode) on the machine may be known and well defined. In other words, the operating system kernel and support structure may be available for static analysis. In addition, the ability to take a memory snapshot from time to time can also be desirable. These assumptions may be more available in some settings. For example, PCs that individuals use in their homes typically run a large variety of device drivers which can make the static analysis more difficult. Furthermore, having end users take memory snapshots on their home computers can be more challenging, since stopping a home computer for several seconds while the memory snapshot is read out can be inconvenient. On the other hand, operating systems that run in virtual machines or in a cloud computing environment can more easily satisfy the criteria of having a defined operating system kernel where a raw memory snapshot can be obtained.

Another technique often employed by kernel mode malware is to hide itself by either hijacking control flow or directly manipulating kernel objects. For instance, to hide a process in a Task Manager of Microsoft Windows™, an attacker can either hijack the system call to the NtQuerySystemInformation function or unlink the corresponding process object from the active process list. Previous efforts have focused on detecting specific types of hidden objects by hard coding expert knowledge of the related data structures. Such approaches are time-consuming, and use a human expert with deep knowledge of the system to create the rules.

Given the ability to map kernel objects, the system can systematically uncover hidden objects of arbitrary type with little human effort. Hidden objects in the operating system kernel can be found by comparing objects found in the object graph with the list of objects in a kernel object viewer to identify hidden objects unknown to the kernel object viewer. The kernel object viewer may be an application such as Windows™ Task Manager or the WinObj utility program which can maintain a list of executing objects that are registered and/or visible in the operating system. If an object is found that does not match the list being checked, the object is likely to be a malware object. Accordingly, the hidden objects found can be marked as malware objects for further analysis by a system administrator or a malware signature checking engine. This comparison process may be repeated multiple times to avoid false alarms caused by state variations from the time that the internal program is executed to the time that the memory snapshot is taken.

Compared with previous approaches, this hidden object identification has at least two results. First, the amount of manual effort is small since the deep knowledge of data structures resides inside the system already. For instance, to get the list of loaded drivers using the present technology, the system just needs to know that a specific pointer in each driver object refers to the driver's name. Second, the exhaustive traversal of all the pointer paths enables the identification of a hidden kernel object as long as at least one pointer path to the object exists.

Figure 3:
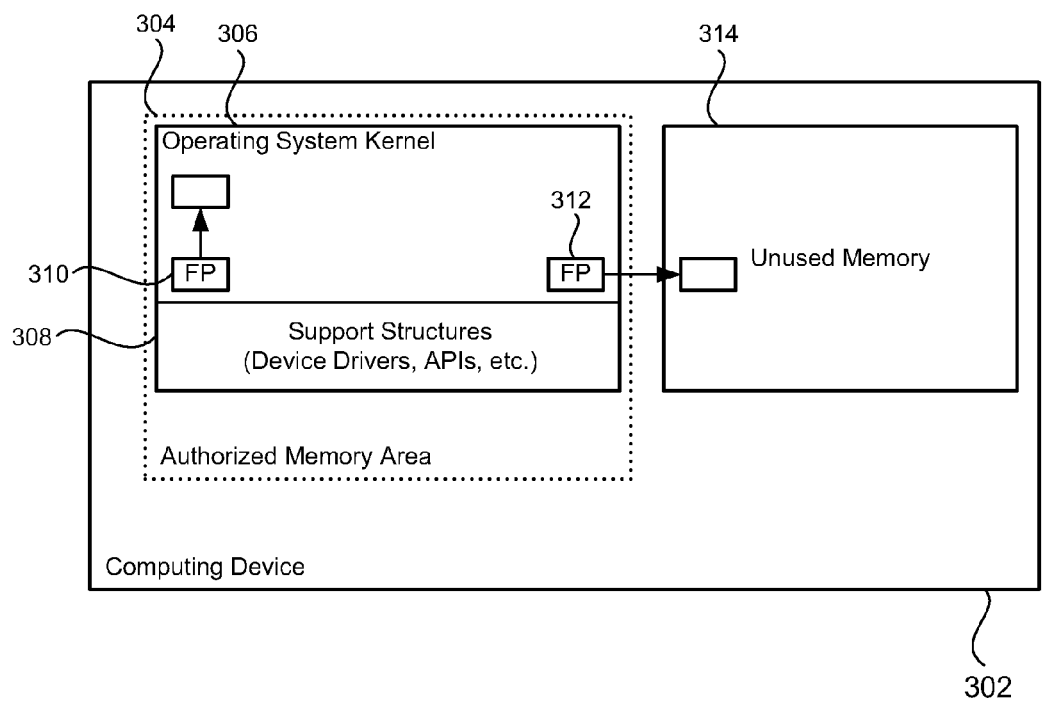
FIG. 3 is a block diagram illustrating an embodiment of memory during malware investigation by analyzing computer memory and an authorized memory area.

FIG. 3 is a block diagram illustrating a summary of an organization of memory related to a system for malware investigation by analyzing computer memory and an authorized memory area on a computing device. As discussed, an operating system kernel 306 (e.g., a software environment) and related support structures 308 can be statically analyzed from a memory snapshot to map out an authorized memory area 304. Function pointers 310, 312 in the operating system kernel can be identified. The function pointer references can then be checked. Function pointers 310 that reference the authorized memory area are considered to be uncompromised by malicious code or malware. Function pointers that reference unused memory 314 or other areas or memory outside the authorized memory area will be considered to be compromised by malicious code.

To reiterate, the technology can take a memory snapshot as input from a running computer and find the dynamic data structures together with their types. The memory snapshot can come from a computer that runs operating system kernel software where access to the underlying code is available, and that code can be analyzed in a static analysis phase. Given these initial conditions and a complete view of the dynamic data structures, precise conditions can be formulated that a correct system is desired to meet. For example, all possible ways which can cause code to be executed can be checked. This includes the function pointers in discovered data structures. These function pointers are likely to be either NULL or point to a valid location (function entry point) in known code. If this is not the case, then there is a strong indication that the computer has been compromised by malicious software. The function pointer criterion is not quite complete in the sense that there are other ways of causing malware to be executed. However, given a complete view of dynamic memory, formulating a substantially complete criterion is possible. Given such a complete criterion, ascertaining whether a running computer system has been compromised when exposed to an uncontrolled environment such as the internet is possible.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method comprising:

performing static analysis on code of an operating system to identify data types of the operating system;

forming an extended type graph reflecting the data types identified by the static analysis of the code;

obtaining a raw memory snapshot of a computer memory of a computing device during runtime of the operating system, the raw memory snapshot including the operating system executing on the computing device;

finding dynamic data structures and individual data types of the dynamic data structures in the raw memory snapshot using the extended type graph, wherein the dynamic data structures include one or more function pointers and are allocated or freed during runtime of the operating system;

forming an object graph from static data structures of the operating system and the dynamic data structures that include the one or more function pointers;

defining an authorized memory area having executable code, the static data structures, and the dynamic data structures; and checking the one or more function pointers included in the dynamic data structures that are allocated or freed during the runtime of the operating system and validating that the one or more function pointers reference one or more valid memory locations in the authorized memory area to validate whether the computer memory is uncompromised.

2. The method as in claim 1, wherein the operating system comprises a support structure including device drivers.

3. The method as in claim 1, wherein forming the extended type graph comprises:

adding, to the extended type graph, nodes representing the data types identified by the static analysis of the code of the operating system; and adding, to the extended type graph, edges that represent pointers between linked data types, wherein the pointers between the linked data types are also identified by the static analysis of the code of the operating system.

4. The method as in claim 1, further comprising generating the object graph by adding, to the extended type graph, nodes representing the dynamic data structures.

5. The method as in claim 1, further comprising:

identifying kernel loading paths that enable code to be executed on the computer memory without using pointers to functions; and checking whether malicious code is trying to execute using the identified kernel loading paths.

6. The method as in claim 1, further comprising ascertaining whether the computing device has been compromised by being exposed to an uncontrolled computing environment by checking for compromised function pointers and compromised loading paths.

7. The method as in claim 1, wherein the operating system runs in a virtual machine for which the raw memory snapshot is obtained.

8. The method as in claim 1, wherein the extended type graph further reflects the static data structures, the method further comprising:
finding the dynamic data structures by starting with the static data structures in the extended type graph and traversing pointers in the extended type graph until the dynamic data structures are reached,
wherein the static data structures are allocated prior to the runtime of the operating system and the traversing includes traversing from an individual static data structure pointer allocated prior to the runtime of the operating system to an individual dynamic data structure pointer allocated during the runtime of the operating system.

9. A system comprising:
a computing device having a computer memory;
a memory snapshot module configured to obtain a raw memory snapshot of the computer memory, the computer memory containing executable code of an operating system kernel executing on the computing device;
a memory analysis module configured to:
find dynamic data structures of the operating system kernel and individual data types of the dynamic data structures in the raw memory snapshot using an extended type graph of data types of the operating system kernel, wherein the dynamic data structures are allocated in the computer memory during runtime of the operating system kernel,
define an authorized memory area of the operating system kernel, and
identify function pointers in the dynamic data structures that are allocated in the computer memory during runtime of the operating system kernel; and
a kernel integrity checking module configured to:
check whether the function pointers included in the dynamic data structures that are allocated during runtime of the operating system kernel reference valid memory locations in the authorized memory area, and
determine that the computer memory of the computing device is not compromised by individual function pointers that reference the valid memory locations,
wherein the computing device is configured to execute the memory snapshot module, the memory analysis module, and the kernel integrity checking module, and
wherein the data types of the operating system kernel are identified by static analysis of source code of the operating system kernel other than the executable code of the operating system kernel.

10. The system as in claim 9, wherein the memory analysis module is further configured to form an object graph from static data structures in the authorized memory area, the dynamic data structures, and the function pointers.

11. The system as in claim 9, wherein the extended type graph comprises: nodes representing the data types of the operating system kernel, the data types of the operating system kernel being defined in the source code of the operating system kernel, edges representing pointers between linked data types of the operating system kernel, and nodes representing individual dynamic data structures.

12. The system as in claim 9, wherein the kernel integrity checking module is further configured to identify another individual function pointer that points to a location outside of a valid memory block as a compromised memory pointer, the another individual function pointer being included in an individual dynamic data structure that is allocated during runtime of the operating system kernel.

13. The system as in claim 9, wherein the memory snapshot module is further configured to obtain the raw memory snapshot from a virtual machine on the computing device.

14. The system as in claim 9, wherein the operating system kernel comprises a support structure having device drivers, application program interfaces, virtual device drivers, and direct hardware interfaces.

15. The system as in claim 9, wherein the memory analysis module is further configured to:
identify an implicit function pointer in an individual dynamic data structure, wherein the implicit function pointer is runtime allocated and is not declared as a function pointer; and
determine that the implicit function pointer is a compromised function pointer when the implicit function pointer points outside of the authorized memory area.

16. One or more computer memory devices or computer storage devices storing instructions which, when executed by one or more processors, cause the one or more processors to perform acts comprising:
performing static analysis on source code of an operating system kernel to form an extended type graph, the static analysis being performed without executing the source code of the operating system kernel;
when executable code of the operating system kernel is executing, obtaining a raw memory snapshot that includes the executable code of the operating system kernel;
finding dynamic data structures of the operating system kernel in the raw memory snapshot by traversing the extended type graph to identify the dynamic data structures of the operating system kernel, wherein the dynamic data structures of the operating system kernel are allocated when the executable code of the operating system kernel is executing;
forming an object graph from static data structures of the operating system kernel and the dynamic data structures of the operating system kernel;
forming an authorized memory area using the object graph, the authorized memory area having an executable code of the operating system kernel, the static data structures of the operating system kernel, and the dynamic data structures of the operating system kernel;
identifying, in the authorized memory area, function pointers included in the dynamic data structures of the operating system kernel that are allocated when the executable code of the operating system kernel is executing, the dynamic data structures including implicit function pointers that are not declared as function pointers and explicit function pointers that are declared as function pointers; and
validating that the computer memory is uncompromised by malware by checking whether the explicit function pointers and the implicit function pointers reference valid memory locations in the authorized memory area.

17. The one or more computer memory devices or computer storage devices as in claim 16, the acts further comprising:
generating a points-to graph with nodes representing program pointers and edges representing connections between the program pointers;
inferring candidate target types for generic pointers; and producing the extended type graph from the points-to graph and the generic pointers with the candidate target types.

18. The one or more computer memory devices or computer storage devices as in claim 16, the acts further comprising:
finding hidden objects in the operating system kernel unknown to a kernel object viewer by comparing objects found in the object graph with a list of objects in the kernel object viewer to identify the hidden objects that are unknown to the kernel object viewer.

19. The one or more computer memory devices or computer storage devices as in claim 18, the acts further comprising:
marking the hidden objects as malware objects.

20. The one or more computer memory devices or computer storage devices as in claim 16, the acts further comprising:
identifying individual implicit function pointers that are defined in a union data structure.

* * * * *